United States Patent
Song et al.

(10) Patent No.: US 11,005,819 B1
(45) Date of Patent: *May 11, 2021

(54) SECURE SURROGATE CLOUD BROWSING

(71) Applicants: Menlo Security, Inc., Menlo Park, CA (US); The Regents of the University of California, Oakland, CA (US)

(72) Inventors: Xiaodong Dawn Song, Berkeley, CA (US); Ian Fischer, Berkeley, CA (US); Gautam Altekar, Sunnyvale, CA (US); Lorenzo Martignoni, Zurich (CH); Zvonimir Pavlinovic, Berkeley, CA (US)

(73) Assignee: Menlo Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,645

(22) Filed: Dec. 22, 2016

Related U.S. Application Data (63) Continuation of application No. 15/177,335, filed on Jun. 8, 2016, now abandoned, which is a continuation of application No. 13/531,201, filed on Jun. 22, 2012, now Pat. No. 9,391,832.

(60) Provisional application No. 61/567,039, filed on Dec. 5, 2011.

(51) Int. Cl.
*G06F 12/14* (2006.01)
*H04L 29/06* (2006.01)

(52) U.S. Cl.
CPC ...... *H04L 63/0281* (2013.01); *G06F 12/1408* (2013.01); *H04L 63/1441* (2013.01); *G06F 2212/1052* (2013.01)

(58) Field of Classification Search
CPC .............. H04L 63/0281; H04L 63/1441; G06F 12/1408; G06F 2212/1052
USPC .................................... 709/203; 726/22, 24
See application file for complete search history.

(56) References Cited

U.S. PATENT DOCUMENTS

| | | | |
|---|---|---|---|
| 6,253,234 B1 | 6/2001 | Hunt | |
| 6,615,212 B1 | 9/2003 | Dutta | |
| 6,829,746 B1 | 12/2004 | Schwerdtfeger | |
| 7,769,820 B1 | 8/2010 | Spies | |
| 8,510,571 B1 | 8/2013 | Chang | |
| 8,559,642 B2 | 10/2013 | Wurm | |
| 8,745,742 B1 * | 6/2014 | Satish | G06F 7/00 726/24 |
| 8,788,616 B2 | 7/2014 | O'Laughlen | |
| 8,839,460 B2 * | 9/2014 | Shirlen | G06F 21/55 726/34 |
| 2002/0069241 A1 | 6/2002 | Narlikar | |
| 2002/0073155 A1 | 6/2002 | Anupam | |

(Continued)

OTHER PUBLICATIONS

Moshchuk et al., Flashproxy: Transparently Enabling Rich Web Content via Remote Execution, MobiSys'08, Jun. 2008.

(Continued)

*Primary Examiner* — Nicholas P Celani
*Assistant Examiner* — Karina J Garcia-Ching
(74) *Attorney, Agent, or Firm* — Van Pelt, Yi & James LLP (57) ABSTRACT

Surrogate browsing techniques are disclosed. A request for a page is received, from a client, by a surrogate. The specified page is requested by the surrogate from a site. Data received from the site in response to the request is rendered at the surrogate. A representation of the page is transmitted to the client.

57 Claims, 6 Drawing Sheets

(56) References Cited

U.S. PATENT DOCUMENTS

| | | |
|---|---|---|
| 2003/0196104 A1 | 10/2003 | Baber |
| 2005/0039141 A1 | 2/2005 | Burke |
| 2008/0098301 A1 | 4/2008 | Black |
| 2008/0235239 A1 | 9/2008 | Penton |
| 2009/0060032 A1* | 3/2009 | Schmit .................. H04N 19/40 375/240.01 |
| 2009/0097651 A1 | 4/2009 | Whillock |
| 2009/0138937 A1 | 5/2009 | Erlingsson |
| 2009/0179917 A1* | 7/2009 | Hargreaves ............. G09G 5/00 345/629 |
| 2009/0182844 A1* | 7/2009 | Barton ................ G06F 16/9577 709/219 |
| 2010/0036853 A1 | 2/2010 | Jones |
| 2010/0042709 A1 | 2/2010 | Liesche |
| 2010/0095219 A1* | 4/2010 | Stachowiak ........ G06F 16/9562 715/745 |
| 2010/0268739 A1 | 10/2010 | Zalepa |
| 2010/0306642 A1 | 12/2010 | Lowet |
| 2011/0088039 A1* | 4/2011 | Tabone .............. G06F 21/6218 718/104 |
| 2011/0113230 A1* | 5/2011 | Kaminsky ........... G07F 17/3223 713/2 |
| 2011/0145694 A1* | 6/2011 | Graves .............. G06F 17/30905 715/234 |
| 2011/0283267 A1* | 11/2011 | Waite ................. G06F 11/3672 717/135 |
| 2012/0016959 A1* | 1/2012 | O'Laughlen ...... G06F 17/30702 709/217 |
| 2012/0030224 A1* | 2/2012 | Cohen ............. G06F 17/30899 707/758 |
| 2012/0054616 A1 | 3/2012 | Mittal |
| 2012/0124372 A1 | 5/2012 | Dilley |
| 2012/0167206 A1* | 6/2012 | Reetz-Lamour ........ G06F 21/51 726/22 |
| 2013/0007882 A1 | 1/2013 | Devarajan |

OTHER PUBLICATIONS

Moshchuk et al., SpyProxy: Execution-based Detection of Malicious Web Content, 2007.

* cited by examiner

FIG. 6

SECURE SURROGATE CLOUD BROWSING

CROSS REFERENCE TO OTHER APPLICATIONS

This application is a continuation of co-pending U.S. patent application Ser. No. 15/177,335, entitled SECURE SURROGATE CLOUD BROWSING filed Jun. 8, 2016 which is incorporated herein by reference for all purposes, which is a continuation of U.S. patent application Ser. No. 13/531,201, entitled SECURE SURROGATE CLOUD BROWSING filed Jun. 22, 2012, now U.S. Pat. No. 9,391,832, which is incorporated herein by reference for all purposes, which claims priority to U.S. Provisional Patent Application No. 61/567,039 entitled SECURE SURROGATE CLOUD BROWSING filed Dec. 5, 2011 which is also incorporated herein by reference for all purposes.

BACKGROUND OF THE INVENTION

One way that nefarious individuals perpetrate computer attacks is by exploiting browser vulnerabilities. When an unsuspecting user visits a website hosting malicious content, that user's browser can by compromised and the compromise can further be extended to other resources on the user's computer. Exposure to known threats can sometimes be prevented by having users routinely apply patches or otherwise update their browsers. Unfortunately, many users lack the skill or knowledge to keep their browsers up to date (or run legacy browsers for which such patches/updates are not available) and thus remain vulnerable to preventable attacks. Approaches such as having patches automatically applied can reduce but not eliminate risk. For example, even browsers diligently kept up-to-date can be compromised by zero-day and/or other attacks that the browser is not capable of withstanding.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
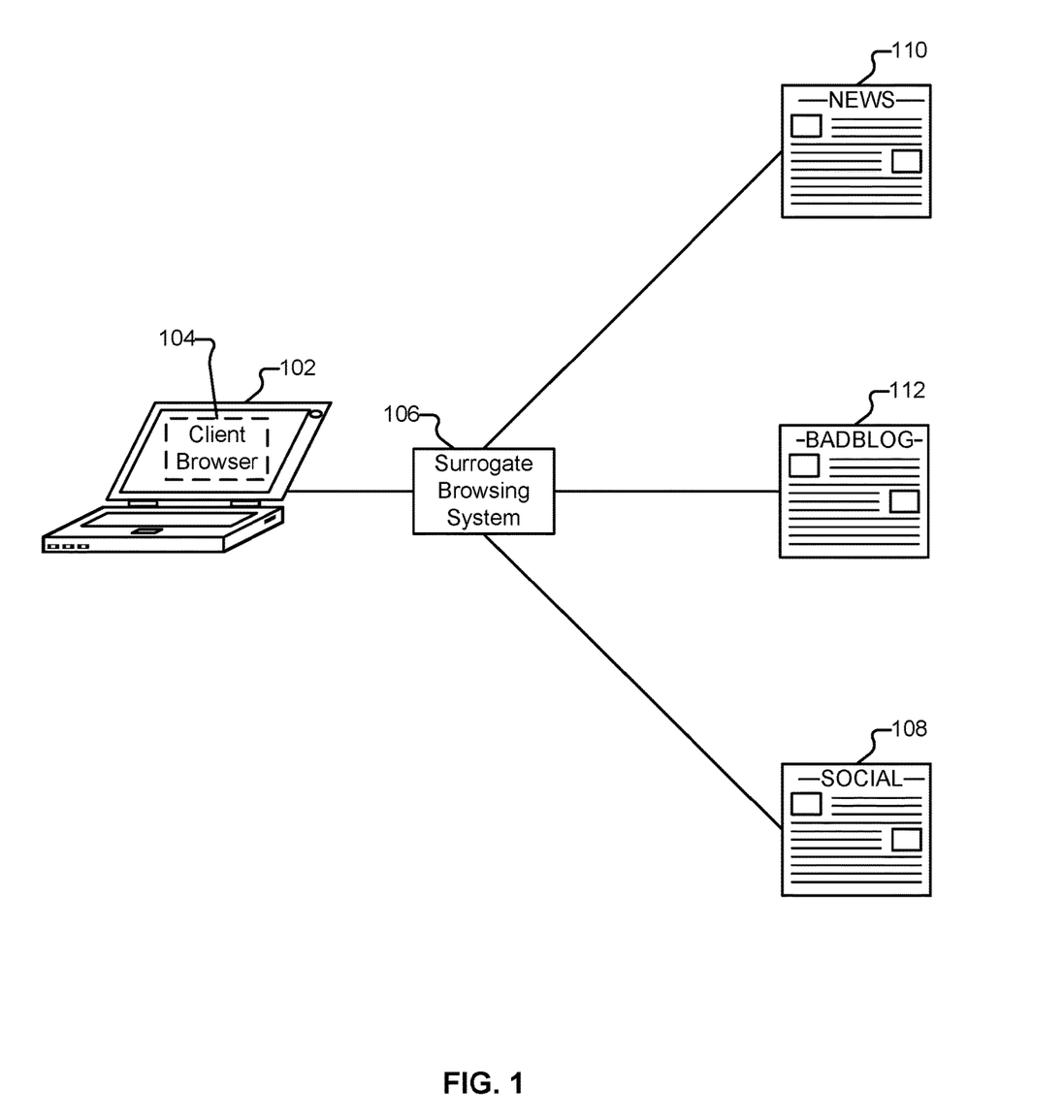
FIG. 1 illustrates an embodiment of an environment in which surrogate browsing services are provided.

FIG. 1 illustrates an embodiment of an environment in which surrogate browsing services are provided. In the example shown, client device 102 (e.g., a laptop computer) is executing a client browser application 104. Embodiments of the techniques described herein are applicable to a variety of client devices and browser applications. For example, desktop computers, tablet devices, smartphones, game consoles, and set top boxes are all examples of client devices. Client browser 104 can similarly be one of a variety of browsers, including: a legacy browser (e.g., Internet Explorer 6); a browser for a mobile device such as a tablet; a modern browser that is not current on its patches/updates; and/or a modern browser whose patches are up-to-date.

Suppose a user of client 102 (hereinafter referred to as "Alice") has an account on social networking website 108. Via site 108, Alice learns about news articles that are of interest to her friends. For example, Alice's friend, Bob, might include in his profile on site 108 a link to a news article about a solar eclipse. The news article is located on news website 110. While website 110 is legitimate, suppose it has unfortunately been compromised and is perpetrating drive-by download attacks. If Alice were to visit website 110 directly using client browser 104, Alice's browser would quickly be compromised. If, instead, Alice used the services of surrogate browsing system 106, Alice's browser would be protected. As will be described in more detail below, surrogate browsing system 106 provides protection to browsers such as browser 104 by obtaining and rendering content on behalf of users, and then transmitting a representation of that content on to the client browser.

The surrogate browser can perform all dynamic rendering of a page, including potentially dangerous JavaScript. As will be described in more detail below, in some embodiments, after the page has been rendered by the surrogate, a transcoding engine transcodes the page layout of the rendered page in the surrogate browser and sends it to the client in the form of layout updates, canonicalized Cascading Style Sheets (CSS), and/or canonicalized images or other resources. Third party JavaScript and/or plugins, and malformed images/CSS are not sent to the client. Users, such as Alice, can interact with the representations, such as by clicking on links—resulting in safe and enjoyable user experiences.

System 106 is illustrated as a single logical device in FIG. 1. As will be described in more detail below, in various embodiments, system 106 is a scalable, elastic architecture and can comprise several distributed components, including components provided by one or more third parties. Further, when system 106 is referred to herein as performing a task, such as transmitting or processing data, it is to be understood that a sub-component or multiple sub-components of system 106 (whether individually or in cooperation with third party components) may cooperate to perform that task. As one example, system 106 can comprise a single (or multiple) Amazon EC2 Extra Large High-CPU instances, including 7 GB of RAM, 8 virtual cores, and Gigabit Ethernet connections. Such instances can be geographically distributed—located at data centers around the world.

Figure 2A:
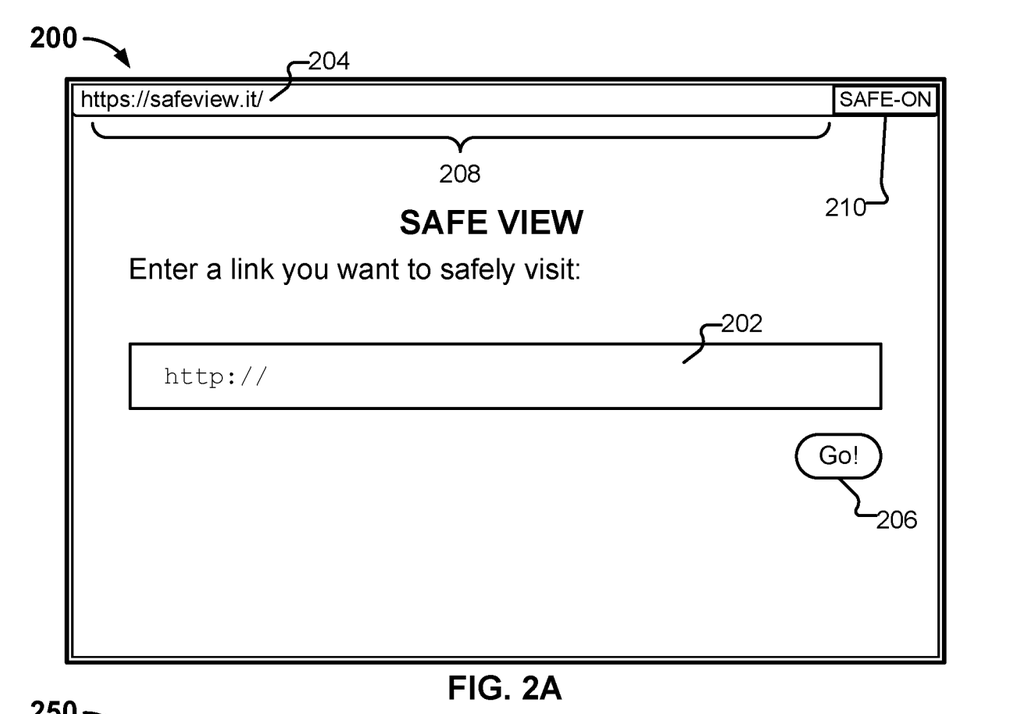
FIG. 2A illustrates an embodiment of an interface as rendered in a browser.

Depicted in FIG. 2A is one example way that Alice can avail herself of the surrogate browsing services of system 106. In particular, FIG. 2A illustrates an embodiment of an interface as rendered in a browser. As shown, Alice has navigated to page 204 using her browser 104. Interface 200 is a web page served by system 106. Alice enters the URL of the page she wishes to securely visit (e.g., http://example-news.com/solareclipse.html) by typing the URL into box 202 and selecting button 206. The services of system 106 can also be accessed in a variety of other ways. For example:

Alice can manually prepend the URL of the page she wishes to securely visit (examplenews.com/solareclipse.html) with a URL associated with system 106 (e.g., https://safeview.it) in URL bar 208. An example of such a composite URL is depicted at 252 in FIG. 2B.

A browser plugin installed on client browser 104, and/or native functionality of client browser 104, as applicable, can be configured to cause Alice's request for site 110 to be directed through system 106. As one example, a toggle button 210 can be included in the browser that allows Alice to toggle whether all (or none) of her web browsing is routed through system 106. As another example, a context menu can be added so that when Alice right-clicks a link (or otherwise activates the context menu), she can select a "view this link safely" option that opens the link using the services of system 106. As yet another example, browser 104 can be configured so that whenever it is launched by Alice's email client (e.g., because Alice has clicked on a link in an email), browsing traffic is routed through system 106. As yet another example, Alice (or another appropriate entity) can specify a whitelist of sites for which the processing of system 106 is not needed/desired (e.g., Alice's banking website) and have all web browsing activity outside of sites included on the whitelist processed by system 106.

The services of system 106 can be integrated into site 108 in a variety of ways. For example, site 108 can be configured to display a "view this link safely" button next to links that are not included in a whitelist of sites (e.g., the top 200 Internet domains). The button can also be made available next to all links—not just those that appear on a whitelist.

System 106 can also provide a URL shortening service (e.g., to site 108) in which all URLs posted by users to site 108 (e.g., http://examplenews.com/solareclipse.html) are replaced with URLs that direct requests through system 106. An example of such a shortened URL is https://safeview.it/7x83dh37. In some embodiments, only some URLs posted to site 108 are shortened (or otherwise changed to system 106 links). For example, site 108 (or another appropriate entity) can maintain a whitelist of sites for which a user is allowed to directly access via links uploaded to site 108. For any other link appearing on site 108 (and/or for links that are determined to be suspicious), the URL shortening service is used. One example of a malicious site is site 112, a blog that hosts pictures of kittens in the hopes of attracting visitors to download malicious applications under the guise of such downloads being kitten-oriented screen savers.

Anti-phishing and other browsing protection software can be integrated with services provided by system 106. For example, instead of blocking a user's access to a suspicious site, or merely warning the user that the site she is about to visit could be malicious, attempts by a user to access suspicious pages can be routed through system 106. In that way, the user can both satisfy her desire to visit the suspicious site and avoid compromising her computer.

System 106 can also be configured to provide protection services by operating in an enterprise mode, described in more detail below. In some embodiments, when running in enterprise mode, system 106 is collocated with other infrastructure of the enterprise, such as by being on premise with the clients that use the system. In other embodiments, the system uses third party services, such as Amazon EC2.

Figure 2B:
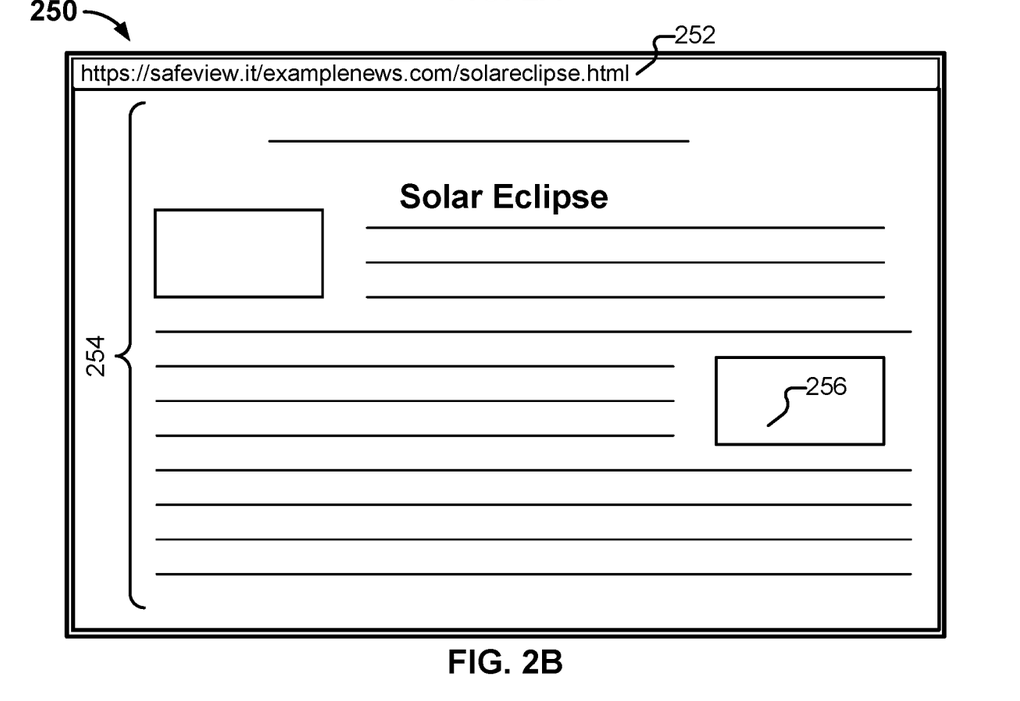
FIG. 2B illustrates an embodiment of an interface as rendered in a browser.

FIG. 2B depicts interface 200 after Alice has typed (or copy and pasted) the URL "examplenews.com/solareclipse.html" into box 202 and pressed button 206. In some embodiments, the content displayed in interface 250 appears, to Alice, to be identical to the content that would have been shown to her if she had visited the page "examplenews.com/solareclipse.html" directly with her browser. As will be described in more detail below, system 106 has fetched the content from site 110 on behalf of Alice, and has processed the received content to generate a representation of the content that is then provided by system 106 to client 102. Also as will be described in more detail below, surrogate browsing system 106 can be configured in a variety of ways and use a variety of techniques to transform the content it receives (e.g., from site 110) prior to transmitting a representation of the content to client 102.

Figure 3:
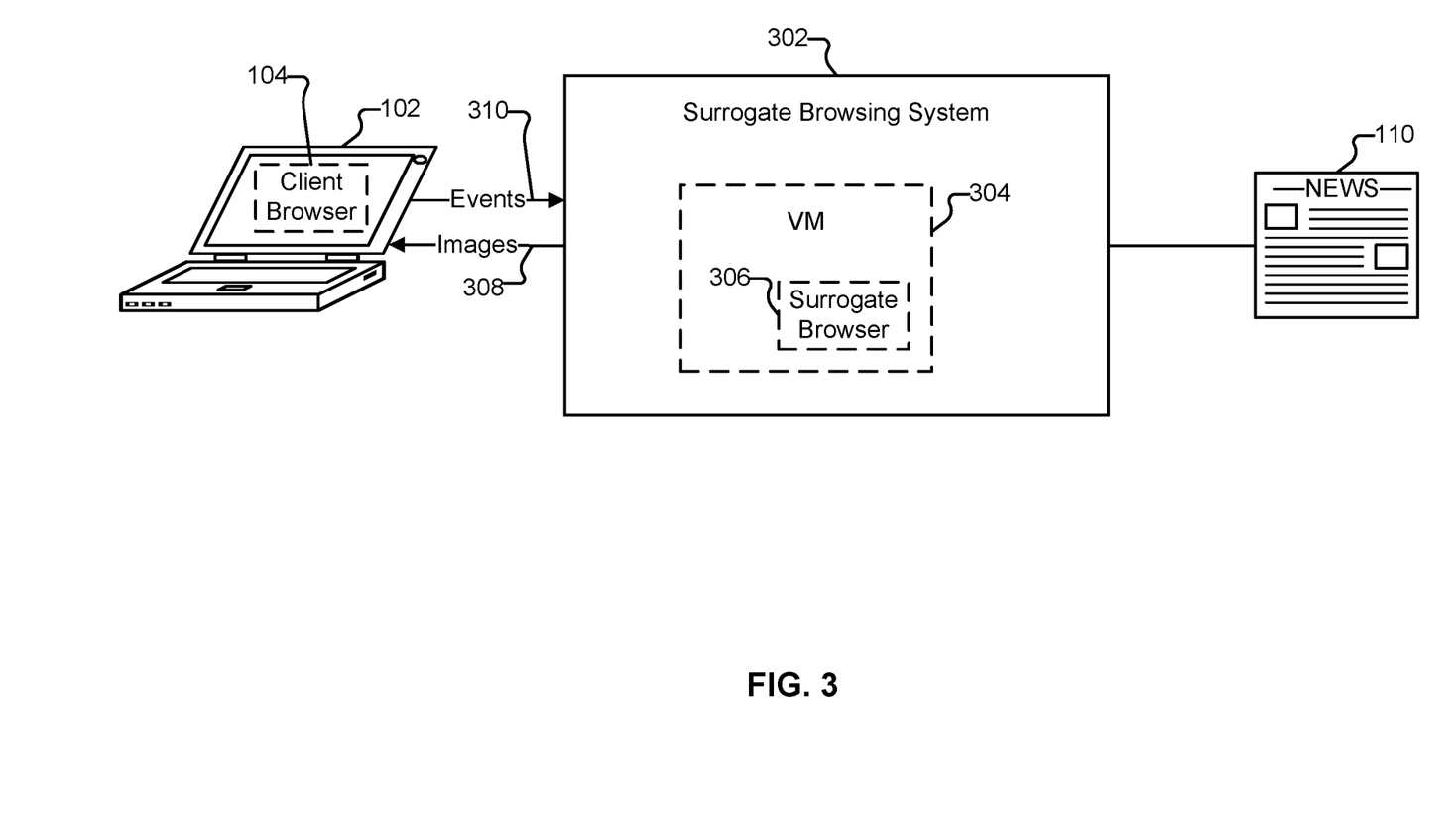
FIG. 3 illustrates an embodiment of a surrogate browsing system.

FIG. 3 illustrates an embodiment of a surrogate browsing system. Surrogate browsing system 302 is one embodiment of surrogate browsing system 106. When Alice connects to system 302, her client browser 104 receives JavaScript that facilitates communication with system 302 via the remote framebuffer (RFB) protocol. As one example, the JavaScript can implement a Virtual Network Computing (VNC) client. Other graphical desktop sharing technologies can also be used in conjunction with the techniques described herein, as applicable.

In the example shown in FIG. 3, when Alice requests access to a page on site 110 (e.g., by clicking submit button 206), a virtual machine 304, in which a surrogate browser application 306 is executing, is made available to browser 104. An image of the page is sent by surrogate browsing system 302 to client 102 (308). In some embodiments, the image sent to Alice is transcoded so that, for example, an attacker cannot send malicious pixels to Alice. When Alice interacts with the image via her browser 104, her events, such as mouse clicks and keyboard presses, are observed and transmitted by the JavaScript executing on client 102 to virtual machine 304 (310). System 302 interprets the received events (e.g., by overlaying the position of the events on Alice's rendering of the page on top of the page as seen by system 302) and surrogate browser 306 takes the corresponding actions with respect to site 110, if applicable. For example, if Alice attempts to click a link on the page she is viewing, her click event is sent to system 302 and browser 306 replicates Alice's click on site 110. If Alice is randomly clicking in white space, in some embodiments, the event is not replicated to site 110. As browser 306's view of the page changes (e.g., a new page is displayed due to following a link), updated images are streamed to Alice's browser 104.

The surrogate browsing approach depicted in FIG. 3 will protect Alice's computer 102 against attacks, such as drive-by downloads and zero-day exploits, that may be present on site 110. Further, with respect to certain websites (e.g., ones with relatively simple layouts), Alice may be unable to distinguish between the experience of accessing the site directly with her browser, or accessing the site using surrogate browsing system 302. The approach shown in FIG. 3 can also be used to allow Alice to safely use certain types of browser plugins (on the surrogate browser) such as Flash. Interaction with some sites, however, using system 302, may be too slow or otherwise less enjoyable for Alice. Other surrogate browsing approaches can also be used, and in particular, will provide good performance even when used in conjunction with more sophisticated sites (e.g., sites with interactive games, and/or which require context such as the position of scroll bars, look of widgetry, and size of internal frames).

As will be described in conjunction with FIG. 4, one alternate surrogate browsing approach is to render a page in a surrogate browser and transcode the layout of the rendered page in a secure manner before sending it to the client browser. One example of such transcoding is to have a dynamic transcoder encode the Document Object Model (DOM) layout of the rendered page and send DOM updates that describe the DOM of the page using a DOM update command language to the thin client layer of the client browser. The dynamic transcoder can also transcode resources such as images and CSS files into sanitized, canonicalized versions for clients to download. In particular, the dynamic transcoding involves the use of two components—a DOM transcoder, and a resource transcoder for transcoding images and CSS. The output of both components passes through a checker proxy that validates the data against a security policy before sending it to the client. A command interpreter running in the client browser interprets the DOM update commands and updates the DOM in the client browser accordingly.

Figure 4:
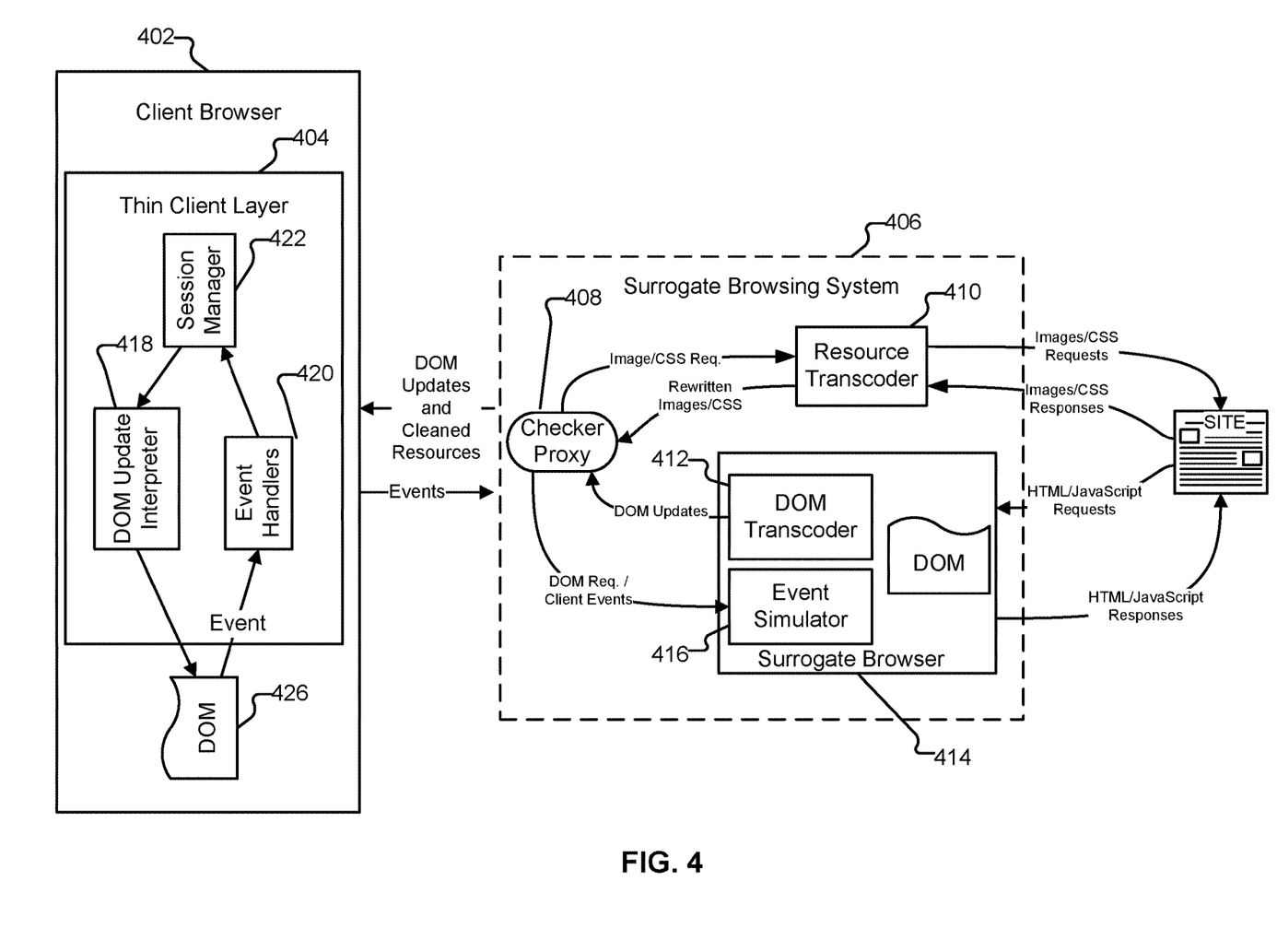
FIG. 4 illustrates an embodiment of a surrogate browsing system.

FIG. 4 illustrates an embodiment of a surrogate browsing system. Surrogate browsing system 406 is one embodiment of surrogate browsing system 106. Client browser 402 is one embodiment of client browser 104. As shown, an unmodified (i.e., stock) browser 402 is executing a thin client layer 404, which is discussed in more detail below. Among other components, system 406 includes a checker proxy 408, a resource transcoder 410, and a surrogate browser 414 that includes a DOM transcoder 412 and an event simulator 416. As explained above, system 406 can comprise scalable, elastic hardware, and can comprise several distributed components including ones provided by one or more third parties. In the example shown, system 406 uses the Amazon Elastic Compute Cloud (Amazon EC2) infrastructure.

When a client initiates a browsing session with system 406, system 406 sends a thin client layer 404 (e.g., signed JavaScript) to the client browser (e.g., 402) that decodes and interprets layout updates, images, and CSS from the surrogate browser. It also intercepts user events and forwards them to the surrogate browser. No client-side installation is needed. Maintenance is performed on the server-side (e.g., on system 106) and any needed updates can be pushed as new JavaScript to client 102. In some embodiments, thin client layer 404 is also configured to use the techniques described in conjunction with FIG. 3, where needed, such as if Alice navigates to a page that requires the use of a Flash plugin or includes the <canvas> tag.

Requests from client browser 402 for system 406 are received by a reverse proxy which routes the requests based on type. If the client is asking for a new page (e.g., because Alice has just clicked button 206), system 406 selects a new surrogate browser to provide surrogate browsing services to the client. In some embodiments, a load balancer is used to help determine which virtual machine should be assigned. A given virtual machine image can support many surrogate browsers. In turn, a given hardware node can support many virtual machines. If the request implicates an existing session (e.g., Alice has hit the "reload" button), the reverse proxy routes the handling of the request to the previously-used surrogate browser.

In some embodiments, one surrogate browser is assigned for a given client, per tab, per domain. Each surrogate browser is sandboxed to provide isolation between surrogate browsers (e.g., using a Linux Container). Thus, for example, if Alice has open two tabs in browser 402 (e.g., one to site 110 and one to site 112), two different surrogate browsers will provide services to her. If Alice navigates away from one of the sites (e.g., navigates from site 110 to site 108), the surrogate browser providing Alice services with respect to site 110 will go away, and a fresh surrogate browser will provide services with respect to site 108. Other configurations are also possible. For example, Alice could be assigned a single surrogate browser per session, a surrogate browser per tab (irrespective of which sites she visits in the tab), a surrogate browser per site (irrespective of the number of tabs she has open to that site), etc. Embodiments of individual components of the environment shown in FIG. 4 will now be described.

Surrogate Browsing System

Surrogate Browser

Surrogate browser 414 is a Webkit-based browser (or other appropriate browser) running inside a Linux container—a lightweight and disposable sandboxing environment. The surrogate browser renders requested pages and runs JavaScript code within the pages. It also contains an event simulator component 416 that applies user interaction events (e.g., 310) received from client 102.

DOM Transcoder

The surrogate browser also includes a DOM Transcoder component 412. As described in more detail below, client browser 402 handles DOM updates from surrogate browser 414. The surrogate browser intercepts all DOM mutation events and translates those events using the DOM transfer command language before transmitting them through checker proxy 408 to client browser 402. Surrogate browse 414 detects DOM updates by installing JavaScript DOM update handlers in the surrogate page. One way to do this is to customize Webkit to support all types of DOM mutation events and to generate the events during the initial construction of the DOM. When generating DOM commands to send to client 102, surrogate browser 414 first passes them through a whitelist that removes, among other things, all JavaScript. It also rewrites all URLs to point to through system 106. The <iframe> tag is treated specially: no source URL is sent to client 102. This allows thin client layer 404 to render content from multiple origins without violating a same-origin policy. Surrogate browser 414 enforces the same-origin policy, but handles all interaction and updates for the iframe as for a normal top-level document, with the exception that updates are directed to the top level page in the client browser. Since no JavaScript reaches client browser 402, and all external resources are passed through system 406, it is not possible for a site to convince client browser 402 to implicitly violate the same-origin policy without first compromising surrogate browser 414 and checker proxy 408.

Resource Transcoder

The techniques described herein can be used to allow a user, such as Alice, to view web pages that include such features as images and CSS, without being subject to compromise. In various embodiments, system 106 is configured to serve a canonicalized copy of such resources instead of the original ones (or, instead of preventing them from being displayed at all). In the example shown, the rewriting of images and CSS is performed by resource transcoder 410. In particular, system 406 rewrites the URLs of external images and CSS to redirect client browser resource requests to resource transcoder 410, which then serves the client a cached and harmless copy of the resource. System 406 handles inline images and CSS by forwarding the inline resources to resource transcoder 410 and then substituting them with the ones returned by the transcoder.

As one example, transcoder 410 can transcode images by reading in the file from an input file descriptor and parsing the image from its original format. It then adds cryptographic random noise to the lower-order bits of the pixel data and rewrites the image to its original format, stripping unneeded metadata which can be used as attack vectors. Checker proxy 408, described in more detail below, can cryptographically verify that the noise was added before sending the image data to the client. Other media types can similarly be processed. For example, audio and video files can have noise randomly inserted to reduce the likelihood of an embedded attack payload. Other transformations can also be made and need not rely on the use of cryptographic functions. Modifications made by resource transcoder 410 are also referred to herein as inserted modification data.

Checker Proxy

Checker proxy 408 is configured to validate that the surrogate browser is generating DOM commands and resources as expected. In some embodiments, the checker proxy runs on a separate server from the surrogate browser(s). The checker proxy proxies all calls between client browser 402 and surrogate browser 414. In some embodiments, the checking is performed by making sure that all messages the surrogate browser sends to the client conform to the command language described below.

In some embodiments, the checker first verifies that the commands are all valid JSON. It then passes each individual command through a whitelist filter for that particular command. For example, the "DOM_add_element" command has a list of valid tags and attributes. Any tags and attributes not on that list cause checker 408 to reject the command and terminate the connection between the surrogate and client browsers under the assumption that the surrogate browser will only send invalid commands if it has been compromised. In the case that the checker detects an invalid command or resource, the container for that surrogate browser is cleaned and restarted.

Checker 408 also validates that all URLs it sees begin with the appropriate domain (e.g., safeview.it). This validation checks attributes against a blacklist of attributes that will contain URLs. Any such attribute is verified to begin with the safeview.it (or other appropriate) domain. If it does not, the checker assumes an attack, as above.

Thin Client Layer

The thin client layer includes three logical components: a DOM update interpreter 418, client event input handler(s) 420, and a session manager 422.

DOM Update Interpreter

The DOM update interpreter 418 runs inside client browser 402 and applies incoming DOM updates to the client DOM (426) which are received when dynamic DOM transcoder 412 sends the layout of a page rendered in the surrogate cloud browser as a sequence of DOM updates to the client. The interpretation of these updates ensures that the client browser page shows the latest layout as rendered in the surrogate cloud browser. JavaScript supplies a standardized DOM manipulation API which can be used to update the client DOM based on the commands system 406 sends to client 102.

In some embodiments, DOM updates are defined using an unambiguous command language serialized using JSON. The basic element in the language is a command, which is a list that represents a DOM update. The first element in the list describes the type of update to be applied; the remaining elements are parameters. For example, the following command inserts an element into the local DOM:

[DOM_add_element, type, attributes, unique_id, parent_id, sibling_id]

This command will try to insert an element with type "type" into the DOM, with respect to its parent (parent_id) and successor sibling (sibling_id). The interpreter will also set the _uid attribute to unique_id and will add the additional keys and values in attributes to the element. The other commands are similar to this example. Additional detail regarding the command language is provided below.

Event Handler(s)

Many modern web pages are interactive—user events (e.g., key presses or mouse clicks) influence the content of the web page. Event handler(s) 420 are configured to capture any events created by a user and to make them available (via the thin client layer) to the surrogate browser in a manner that is consistent with what JavaScript running in the surrogate browser page expects. In some embodiments, all events are captured by event handler 420. In other embodiments, only those events for which an event handler is registered are listened for and sent.

Session Manager

Session manager 422 handles three tasks: managing connections with surrogate browsers, such as browser 414, emulating browsing history and page navigation, and providing cookie support.

Regarding communications management: In some embodiments, the session manager uses Websockets (in browsers that support it) and falls back to long-polling otherwise. These technologies enable full-duplex communication between the client and surrogate browsers.

Regarding history and navigation: In some embodiments, system 406 employs DOM updates to provide the illusion that the user is visiting different pages—a DOM reset command clears the current DOM and makes way for DOM updates from the new page. System 406 can provide history and navigation functionality in a variety of ways. As one example, system 406 can instruct client browser 402 to modify its browser history after every navigation action. To ensure that cookie state persists across client browser sessions, system 406 mirrors surrogate cookies in the client, and employs a consistency protocol to keep the client and surrogate cookie jars synchronized. When the client browser initiates a new browsing session with system 406 and visits a domain, session manager 422 transmits the client's cookie jar to the surrogate for that domain only, and the surrogate in turn will install the cookies before loading the page.

Enterprise Mode

Figure 5:
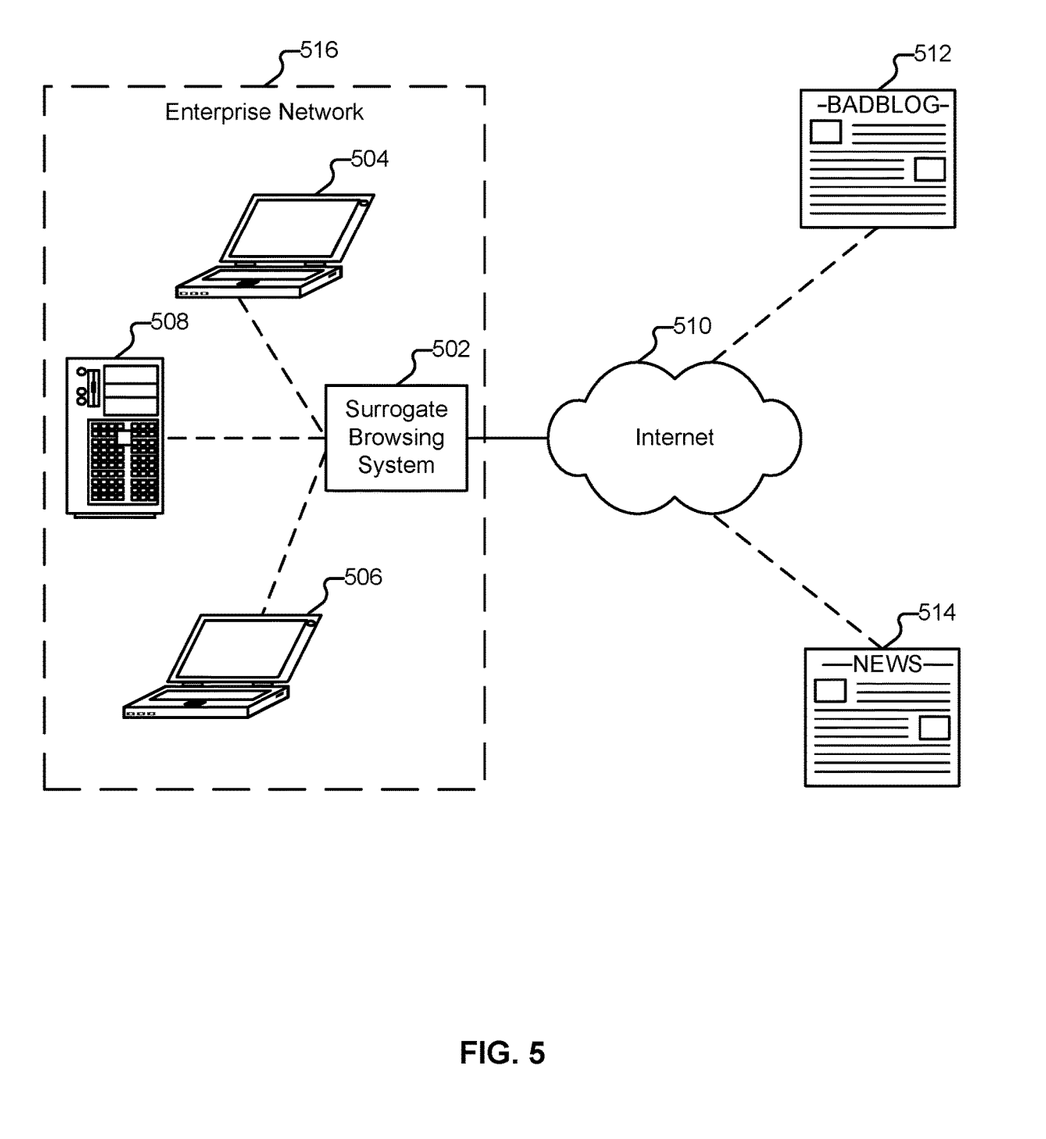
FIG. 5 illustrates an embodiment of a surrogate browsing system.

FIG. 5 illustrates an embodiment of a surrogate browsing system. In the example shown, an enterprise (e.g., the company for which a user, "Charlie," works), has deployed an embodiment of system 106 within its enterprise network 516. In particular, surrogate browsing system 502 is an embodiment of system 106. Other entities can also use the technology described herein in enterprise mode, such as households (e.g., where a single surrogate browsing system sits at the perimeter of the home network). System 502 is owned by or otherwise under the control of the enterprise and comprises commodity server hardware running a server-class operating system. As one example, system 502 includes 8 GB of RAM, an 8-core Intel i7 3.4 GHz processor, and a Gigabit Ethernet adaptor attached to a Gigabit Ethernet network.

As shown, all web browsing traffic in network 516 destined for the Internet (510), such as traffic exchanged between client 504 and blog 512, automatically passes through surrogate browsing system 502. Other appliances may also process such traffic as applicable, such as firewall devices, and are not pictured. In some embodiments, the functionality of system 502 is incorporated into another such device, such as a firewall device.

The settings of system 502 are configurable. For example, instead of diverting all web browsing traffic through system 502, certain sites appearing on whitelists (e.g., site 514) may be accessible directly by clients 504-508, while attempts to browse suspicious sites, such as site 512 must be handled via system 502. As another example, an administrator can specify that only certain clients (e.g., client 504 and 506) must use the services of system 502, while client 508 does not. Other policies, such as whether users are alerted to the fact that their web browsing traffic is being processed by system 502 can also be configured. As yet another example, a logo, overlay, or other indicator (e.g., indicating that the browsing is being protected by system 502) can be included in the client browser.

Additional Information—Plugins and HTML5

Plugins such as Flash are the source of many security vulnerabilities in browsers. HTML5 includes tags such as the <canvas> tag, native audio and video support, WebGL, and other features. These tags either include new content streams that may expose vulnerabilities similar to those in images, or new JavaScript calls that must run on the client.

As mentioned above, in some embodiments, such plugins are handled by system 106 by using an unoptimized VNC approach to render the graphical content directly in the browser. Certain plugins can be optimized for, such as Flash support. So, for example, video can be handled similarly to images—by transcoding the video signal and adding noise to reduce the risk of attack, and then passing the video through to our own video player, such as by using the <video> tag.

Additional Information—Command Language Embodiment

In some embodiments, the thin client layer uses only a small subset of the JavaScript DOM API in order to limit the attack surface. For example, the client can be configured to accept twenty commands, which together call only nine DOM API functions. The client JavaScript does not contain any other API calls, and as such is not vulnerable to these attack vectors. This is in comparison to the more than thirty DOM API calls which typical modern browsers support. The command language does not permit regular expressions.

Because all input to the client passes through checker proxy 408's whitelist, each function is called only with canonical arguments. The command language can only produce DOM trees, and it guarantees that all nodes will be unique and live. It achieves these properties by never permitting the attacker from holding a direct reference to a DOM node and by not permitting nodes to be copied or moved. All references are done through names that look up the relevant node in a dictionary. If a node needs to be moved, a new node is generated with the same attributes, and the old node is deleted. This removes two possible attack vectors: it is not possible to create circular graph structures, and deleted nodes cannot be referenced. The following is an example of a specification of a DOM command language:

The basic element in the DOM command language is a command, which is a list that represents a single DOM update. The first element in the list describes the type of update to be applied and the remaining elements are parameters. The checker proxy and the thin client layer recognize only a predefined number of command types.

TABLE 1

Part of the DOM command language specification. Unique_id and frame_id are attributes that maintain the mapping between the client and remote DOM nodes.

| Schema | Description |
| --- | --- |
| DOM_add_element, type, attributes, unique_id, parent_id, sibling_id, frame_id | Add a type element with attributes with respect to the parent and sibling. |
| DOM_remove_element, unique_id, frame_id | Remove an element. |
| DOM_modify_attribute, unique_id, attribute, value, frame_id | Set attribute value of an element to value. |
| DOM_add_cdata, type, unique_id, parent_id, value, frame_id | Add type character data value with respect to the parent. |
| DOM_change_cdata, unique_id, value, frame_id | Change character data to value. |

Table 1 includes some examples of the DOM command language specification. The number of parameters varies depending on the command type. Concrete examples are shown in Table 2.

TABLE 2

Example of DOM update sequence. A div element is added to
the DOM. Then, its id attribute is changed.
Finally, the element is removed from the DOM.

DOM_add_element, "div," [["id," "example"], ["class," "mainCSS"]],
"123121," "245564576," "12353123," "13443253456"
DOM_modify_attribute, "123121," "id," "changed," "13443253456"
DOM_remove_element, "123121," "13443253456"

First, the div element is added to the DOM with respect to the parent node, the sibling node, and the frame. At the same time, its attributes id and class, defined as a list of attribute-value pairs, are updated as well. After the insertion, the element's id attribute is changed to value "changed." Finally, the element is removed from the DOM.

TABLE 3

Example of unsuccessful attacks. In case a),
the checker will not recognize a new command
and classify it as a malicious activity. In case b), the checker
will, using whitelists, observe that the attacker is trying
to inject a script and classify it as an attack.

a) DOM_inject_script, "javascript:do_bad_things( )"
b) DOM_add_element, "script," [["type," "JavaScript"]], "123121,"
   "245564576," "12353123," "13443253456"

To compromise the client, the attacker needs to send a message that conforms to the DOM command language. The attacker may try to attack the thin client layer in a number of ways, for example: 1) to craft a command with a new type or 2) to use an existing command type but with bad parameters. In the first case, the attempt will fail since the checker proxy and the thin client layer only recognize a predefined set of command types. The second attack also fails in most cases, since sensitive parameters are whitelisted. Examples are shown in Table 3.

Example Process Used in Some Embodiments

Figure 6:
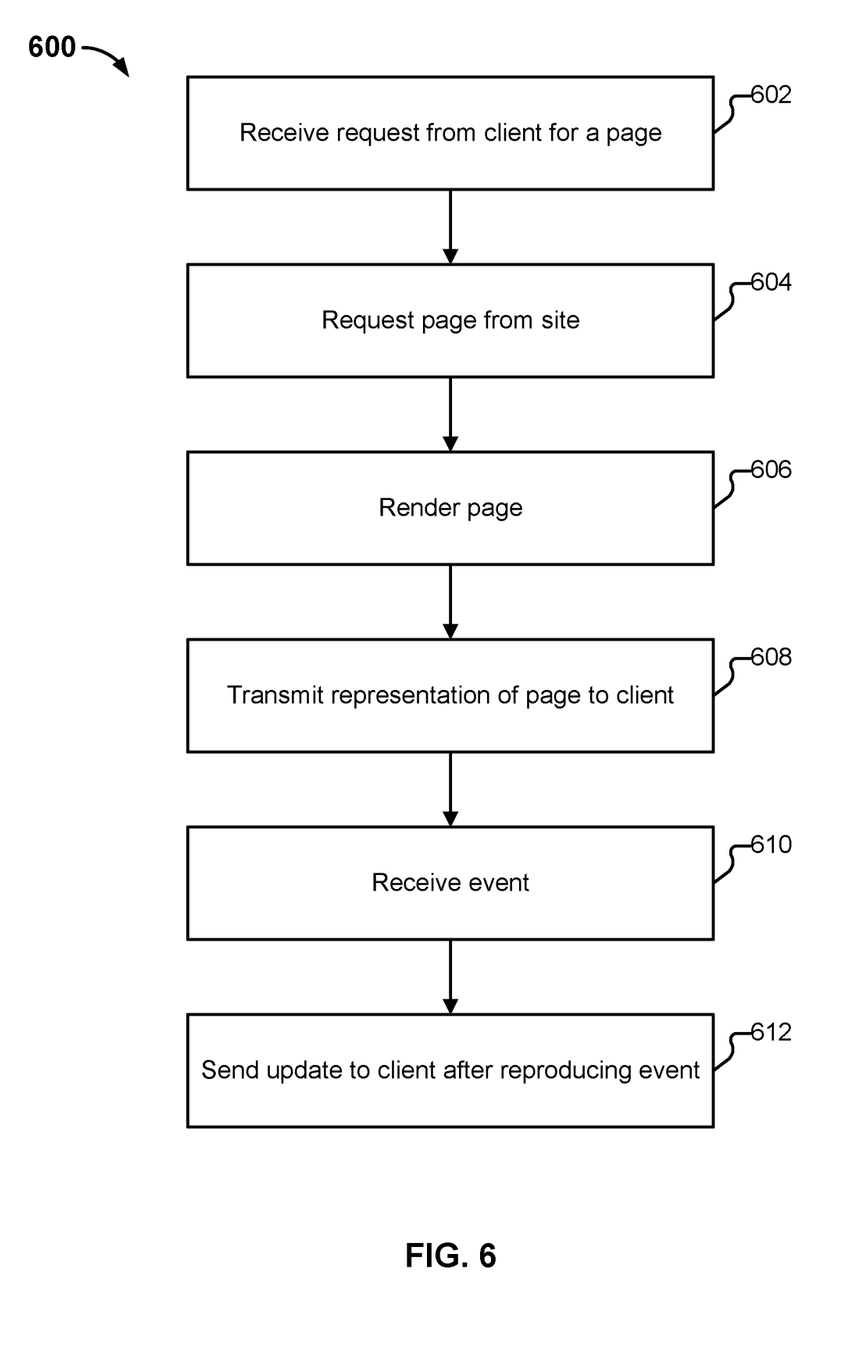
FIG. 6 illustrates an embodiment of a process for protecting a browsing session.

FIG. 6 illustrates an embodiment of a process for protecting a browsing session. In some embodiments, the process shown in FIG. 6 is performed by surrogate browsing system 106. Process 600 can also be performed by various embodiments of system 106, such as system 302, system 406, and system 502, as applicable. Also as applicable, various portions of process 600 can be repeated or omitted.

The process begins at 602 when a request from a client for a page is received. As one example, a request is received at 602 when Alice clicks on button 206 as shown in interface 200 of FIG. 2A. At 604, a page is requested from a site. As an example, system 106 requests the page, "http://example-news.com/solareclipse.html" from site 110 at 604. At 606, the requested page is rendered. As previously explained, the rendering is performed on surrogate browsing system 106.

At 608, a representation of the page is sent to the requesting client. As explained above, the page is transformed in some manner, rather than the exact web traffic being passed from the surrogate browser to the client. As one example, the representation is transmitted as an image (e.g., by system 302) at 608. As another example, the representation transmitted at 608 comprises DOM layout content.

At 610, an event is received. As one example, when Alice clicks on picture 256 of FIG. 2B, an event is sent by client 102 and received by system 106 at 610. Finally, at 612, an update is sent to the client after reproducing the received event. As one example, the click event received at 610 is replicated by event simulator 416. Any resulting changes to the page as rendered in surrogate browser 414 are sent to client 102 as an update at 612—either as an updated image (e.g., in the case of system 302) or as a DOM layout update (e.g., in the case of system 406).

Example—Other Types of Pages

The techniques described herein can be used in conjunction with a variety of types of pages in addition to web pages (e.g., comprising HTML and resources such as images). Examples include Microsoft Word documents and documents in the Adobe Portable Document Format (PDF). As one example, an embodiment of system 302 can be configured to transmit images of a Word document to client 102 (whether via browser 104 or a different application) and to receive events associated with a user's interactions with the Word document. As another example, PDF documents can be rendered in a surrogate viewer and an embodiment of system 302 can be configured to send images of the rendered PDF views to a client.

Embodiments of system 406 can similarly be configured to provide more sophisticated surrogate viewing/editing of documents, such as PDF documents. As one example, PDF documents can be rendered in a surrogate viewer, their internal structures obtained, and encoded prior to sending to a client (e.g., by an embodiment of system 406).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to receive, at a surrogate, a request from a client device for a page;
a processor configured to:
  request, from a site, the page specified by the client device, and in response receive data, wherein the received data comprises at least one malicious media resource, wherein the malicious media resource comprises, as a malicious element, at least one of a malicious image and a malicious audiovisual element;
  generate, at the surrogate, a representation of the page using at least a portion of the received data, wherein the generating includes at least one of: (1) transcoding the malicious audiovisual element from a first audiovisual element to a second audiovisual element, and (2) emulating the malicious audiovisual element, and wherein the generating results in a version of the malicious media resource that does not include the received malicious element;
  transmit the representation of the page to the client device, wherein the representation of the page comprises at least one of: (1) the second audiovisual element, and (2) a Virtual Network Computing emulation of the malicious audiovisual element, wherein prior to rendering at the client device, at least a portion of the representation of the page is checked to confirm that no active content elements are present;
  receive an event that includes at least one of receiving a mouse click and receiving a keyboard entry; and
  determine which of a plurality of surrogates should receive a second event based at least in part on a reverse proxy lookup; and a memory coupled to the processor and configured to provide the processor with instructions.

2. The system of claim 1, wherein the generating includes inserting modification data into a resource.

3. The system of claim 2, wherein the modification data comprises cryptographic material.

4. The system of claim 1, wherein the representation of the page, when rendered at the client device, includes an indication that the page as rendered at the client device has been processed by the system.

5. The system of claim 4, wherein the indication comprises an overlay.

6. The system of claim 1, wherein the representation of the page comprises an image of the rendered page.

7. The system of claim 1, wherein the processor is configured to rewrite, using a resource transcoder, one or more resources, prior to transmitting the representation of the page to the client device.

8. The system of claim 1, wherein the malicious audiovisual element is included in a JavaScript and wherein generating the representation of the page includes rendering the JavaScript.

9. The system of claim 1, wherein the system is further configured to perform a verification on the representation of the page prior to transmitting it to the client device.

10. The system of claim 9, wherein performing the verification includes determining whether a command included in a DOM update is included in a list of approved commands.

11. A method, comprising:
receiving, at a surrogate, a request from a client device for a page;
requesting, from a site, the page specified by the client device, and in response receiving data, wherein the received data comprises at least one malicious media resource, wherein the malicious media resource comprises, as a malicious element, at least one of a malicious image and a malicious audiovisual element;
generating, at the surrogate, a representation of the page using at least a portion of the received data, wherein the generating includes at least one of: (1) transcoding the malicious audiovisual element from a first audiovisual element to a second audiovisual element, and (2) emulating the malicious audiovisual element, and wherein the generating results in a version of the malicious media resource that does not include the received malicious element;
transmitting the representation of the page to the client device, wherein the representation of the page comprises at least one of: (1) the second audiovisual element, and (2) a Virtual Network Computing emulation of the malicious audiovisual element, wherein prior to rendering at the client device, at least a portion of the representation of the page is checked to confirm that no active content elements are present;
receiving an event that includes at least one of receiving a mouse click and receiving a keyboard entry; and
determining which of a plurality of surrogates should receive a second event based at least in part on a reverse proxy lookup.

12. The method of claim 11, wherein the generating includes inserting modification data into a resource.

13. The method of claim 12, wherein the modification data comprises cryptographic material.

14. The method of claim 11, wherein the representation of the page, when rendered at the client device, includes an indication that the page as rendered at the client device has been processed by a system.

15. The method of claim 14, wherein the indication comprises an overlay.

16. The method of claim 11, further comprising rewriting, using a resource transcoder, one or more resources, prior to transmitting the representation of the page to the client device.

17. The method of claim 11, further comprising performing a verification on the representation of the page prior to transmitting it to the client device.

18. A computer program product embodied in a non-transitory tangible computer readable storage medium and comprising computer instructions for:
receiving, at a surrogate, a request from a client device for a page;
requesting, from a site, the page specified by the client device, and in response receiving data, wherein the received data comprises at least one malicious media resource, wherein the malicious media resource comprises, as a malicious element, at least one of a malicious image and a malicious audiovisual element;
generating, at the surrogate, a representation of the page using at least a portion of the received data, wherein the generating includes at least one of: (1) transcoding the malicious audiovisual element from a first audiovisual element to a second audiovisual element, and (2) emulating the malicious audiovisual element, and wherein the generating results in a version of the malicious media resource that does not include the received malicious element;
transmitting the representation of the page to the client device, wherein the representation of the page comprises at least one of: (1) the second audiovisual element, and (2) a Virtual Network Computing emulation of the malicious audiovisual element, wherein prior to rendering at the client device, at least a portion of the representation of the page is checked to confirm that no active content elements are present;
receiving an event that includes at least one of receiving a mouse click and receiving a keyboard entry; and
determining which of a plurality of surrogates should receive a second event based at least in part on a reverse proxy lookup.

19. The system of claim 1, wherein the generating includes using a DOM transcoder to rewrite a URL DOM attribute.

20. The system of claim 19, wherein the processor is configured to rewrite all URLs to point through the system.

21. The system of claim 1, wherein the generating includes removing JavaScript.

22. The system of claim 1, wherein the generating includes removing a source URL from an <iframe> tag.

23. The system of claim 1, wherein the generating includes replacing a Flash element with an emulated element.

24. The system of claim 23, wherein the emulated element is provided using a <canvas> tag.

25. The system of claim 23, wherein the emulated element is provided using a <video> tag.

26. The system of claim 1, wherein generating the representation of the page further includes converting the malicious image from a first image format to a second image format that is different from the first image format.

27. The system of claim 1, wherein the portion of the representation of the page is checked against a set of security criteria by a checker proxy.

28. The system of claim 1, wherein noise is added to bits of the first audiovisual element to generate the second audiovisual element.

29. The system of claim 28, wherein the noise is cryptographic random noise.

30. The system of claim 1, wherein the surrogate is a first surrogate and wherein the processor is configured to render a second page for the client device in a second surrogate.

31. The system of claim 1, wherein the page is a first page and is associated with a first domain and wherein the processor is configured to reproduce an event that causes the surrogate to visit a second page that is associated with a second domain that is different from the first domain and wherein the system is configured to visit the second page using a second surrogate.

32. The system of claim 1, wherein the processor is further configured to receive the second event from the client device.

33. The system of claim 1, further comprising a session manager configured to manage cookies between sessions.

34. The system of claim 1, wherein the processor is further configured to validate the second audiovisual element against a security policy prior to transmitting to the client device.

35. The system of claim 1, wherein prior to rendering at the client device, the active content elements are removed from the representation of the page.

36. The system of claim 1, wherein the active content elements include JavaScript.

37. The method of claim 11, wherein the representation of the page comprises an image of the rendered page.

38. The method of claim 11, wherein the malicious audiovisual element is included in a JavaScript and wherein generating the representation of the page includes rendering the JavaScript.

39. The method of claim 17, wherein performing the verification includes determining whether a command included in a DOM update is included in a list of approved commands.

40. The method of claim 11, wherein the generating includes using a DOM transcoder to rewrite a URL DOM attribute.

41. The method of claim 40, further comprising rewriting all URLs to point through the surrogate.

42. The method of claim 11, wherein the generating includes removing JavaScript.

43. The method of claim 11, wherein the generating includes removing a source URL from an <iframe> tag.

44. The method of claim 11, wherein the generating includes replacing a Flash element with an emulated element.

45. The method of claim 44, wherein the emulated element is provided using a <canvas> tag.

46. The method of claim 44, wherein the emulated element is provided using a <video> tag.

47. The method of claim 11, wherein generating the representation of the page further includes converting the malicious image from a first image format to a second image format that is different from the first image format.

48. The method of claim 11, wherein the portion of the representation of the page is checked against a set of security criteria by a checker proxy.

49. The method of claim 11, wherein noise is added to bits of the first audiovisual element to generate the second audiovisual element.

50. The method of claim 49, wherein the noise is cryptographic random noise.

51. The method of claim 11, wherein the surrogate is a first surrogate and further comprising rendering a second page for the client device in a second surrogate.

52. The method of claim 11, wherein the page is a first page and is associated with a first domain and further comprising: reproducing the event that causes the surrogate to visit a second page that is associated with a second domain that is different from the first domain and visiting the second page using a second surrogate.

53. The method of claim 11, further comprising receiving the second event from the client device.

54. The method of claim 11, further comprising managing, by a session manager, cookies between sessions.

55. The method of claim 11, further comprising validating the second audiovisual element against a security policy prior to transmitting to the client device.

56. The method of claim 11, wherein prior to rendering at the client device, the active content elements are removed from the representation of the page.

57. The method of claim 11, wherein the active content elements include JavaScript.

* * * * *